United States Patent [19]

Engebretson

[11] Patent Number: 4,594,790
[45] Date of Patent: Jun. 17, 1986

[54] BOREHOLE SURVEYING EMPLOYING RING LASER GYROSCOPE

[75] Inventor: Harold J. Engebretson, Yorba Linda, Calif.

[73] Assignee: Applied Technologies Associates, San Marino, Calif.

[21] Appl. No.: 419,702

[22] Filed: Sep. 20, 1982

[51] Int. Cl.⁴ .................. G01C 19/64; H01S 3/083
[52] U.S. Cl. ................................. 33/304; 356/350
[58] Field of Search ............ 33/304, 312, 313, 302, 33/366; 356/350

[56] References Cited

U.S. PATENT DOCUMENTS

| | | |
|---|---|---|
| 2,309,905 | 2/1943 | Irwin et al. . |
| 2,635,349 | 4/1953 | Green . |
| 2,674,049 | 4/1954 | James, Jr. . |
| 2,681,657 | 6/1954 | Widess . |
| 2,806,295 | 9/1967 | Ball . |
| 3,037,295 | 6/1962 | Roberson . |
| 3,052,029 | 9/1962 | Wallshein . |
| 3,137,077 | 6/1964 | Rosenthal . |
| 3,241,363 | 3/1966 | Alderson et al. . |
| 3,308,670 | 3/1967 | Granqvist . |
| 3,535,040 | 10/1970 | Vigneri et al. ............... 356/350 |
| 3,561,129 | 2/1971 | Johnston . |
| 3,563,662 | 2/1971 | Wing ............................ 356/350 |
| 3,753,296 | 8/1972 | Van Steenwyk . |
| 3,894,341 | 7/1975 | Kapeller . |
| 4,197,654 | 4/1980 | Van Steenwyk . |
| 4,199,869 | 4/1980 | Van Steenwyk . |
| 4,244,116 | 1/1981 | Barriac . |
| 4,265,028 | 5/1981 | Van Steenwyk ............... 33/304 |
| 4,433,491 | 2/1984 | Ott et al. ..................... 33/304 X |

OTHER PUBLICATIONS

IEEE Spectrum, Oct. 1967, pp. 44–55 by Joseph Killpatrick.

Primary Examiner—William D. Martin, Jr.
Attorney, Agent, or Firm—William W. Haefliger

[57] ABSTRACT

A borehole mapping apparatus which employs a ring laser gyroscope. The path of the laser is defined by looping paths of laser beam travel having long and short stretches of travel. The ratio of the stretches being substantially greater than two.

1 Claim, 10 Drawing Figures

BOREHOLE SURVEYING EMPLOYING RING LASER GYROSCOPE

BACKGROUND OF THE INVENTION

This invention relates generally to the usage of ring laser gyroscopes in the determination of azimuth information in a borehole or well. More particularly, it relates to the optimum design and methods of usage of a ring laser gyroscope in the azimuth determination application, in ways to obtain the best possible accuracy along with minimum cost.

The use of one or more angular rate sensors along with one or more suitable acceleration sensors in borehole azimuth determination is well know. U.S. Pat. No. 3,753,296 describes the use of a single angular rate sensor, and U.S. Pat. No. 4,199,869 describes the use of two angular rate sensors, each having two axes of measurement sensitivity. In each of these patents, suitable acceleration sensors are provided to complete the required sensing functions. U.S. Pat. No. 4,197,654 describes the use of a single angular rate sensor having its axis of sensitivity canted so that a component of the input axis of sensitivity lies along the borehole axis.

The environmental and physical limitations of borehole surveying or direction measurement create significant problems for high accuracy measurements using conventional gyroscopes or other conventional angular rate sensors. Wide temperature ranges, acceleration sensitive gyroscope errors, and often severe vibration inputs react to cause measurement errors. The ring laser gyroscope has been shown to approach theoretically ideal gyroscope performance with very accurate rate measuring scale factor, very low temperature and acceleration sensitive errors in gyroscope output, extremely rugged construction, and random errors limited only by the quantum limits of the gyroscopes laser action. These attributes make a ring laser gyroscope highly desirable and attractive for use in the borehole surveying problem.

SUMMARY OF THE INVENTION

It is a major object of the invention to provide improved accuracy along with reduced cost and complexity in borehole surveying by using a ring laser gyroscope of unique configuration in specific manners so as to achieve the desired results including optimized performance.

Basically, the apparatus of the invention comprises:

(a) a first ring laser gyroscope sized for travel in a direction lengthwise of and within the hole, the laser gyroscope characterized by two laser beams traveling along looping paths in opposite directions, and (b) means mounting said gyroscope for travel in the hole and for rotation about an axis extending generally in said direction, the looping paths having long and short stretches, the long stretches extending generally in the direction of the borehole.

As will appear, the looping paths, which define the optical path or paths of the gyroscope, are generally rectangular, the long stretches of such rectangular paths extending in the direction of the borehole. The gyroscope has an axis of sensitivity which may be substantially normal to the axis of rotation of the instrument, or may be canted from the normal to that axis, so as to provide a component of sensitivity along that axis.

A further aspect of the invention concerns the provision of a second ring laser gyroscope sized for travel with the first laser gyroscope, the two gyroscopes having axes of sensitivity which are non-parallel. Typically, both may have rectangular optical paths with long stretches extending in the borehole direction; and the axes of sensitivity of the two gyroscopes may extend in generally orthogonal relation (i.e. the planes defined by the two gyroscopes optical paths may extend mutually orthogonally). Also, one or both axes of sensitivity of the two gyroscopes may be canted relative to a normal, or normals, to a common axis of rotation.

Finally, rotation of the laser gyroscope, or two laser gyroscopes, may be carried out, as will be seen, in a manner as to reduce the tendency for locking (natural "dead zone" or "lockband") of the laser gyroscope output or outputs.

These and other objects and advantages of the invention, as well as the details of an illustrative embodiment, will be more fully understood from the following specification and drawings, in which:

DRAWING DESCRIPTION

FIG. 9 is a view like FIG. 1a.

DETAILED DESCRIPTION

Figure 1:
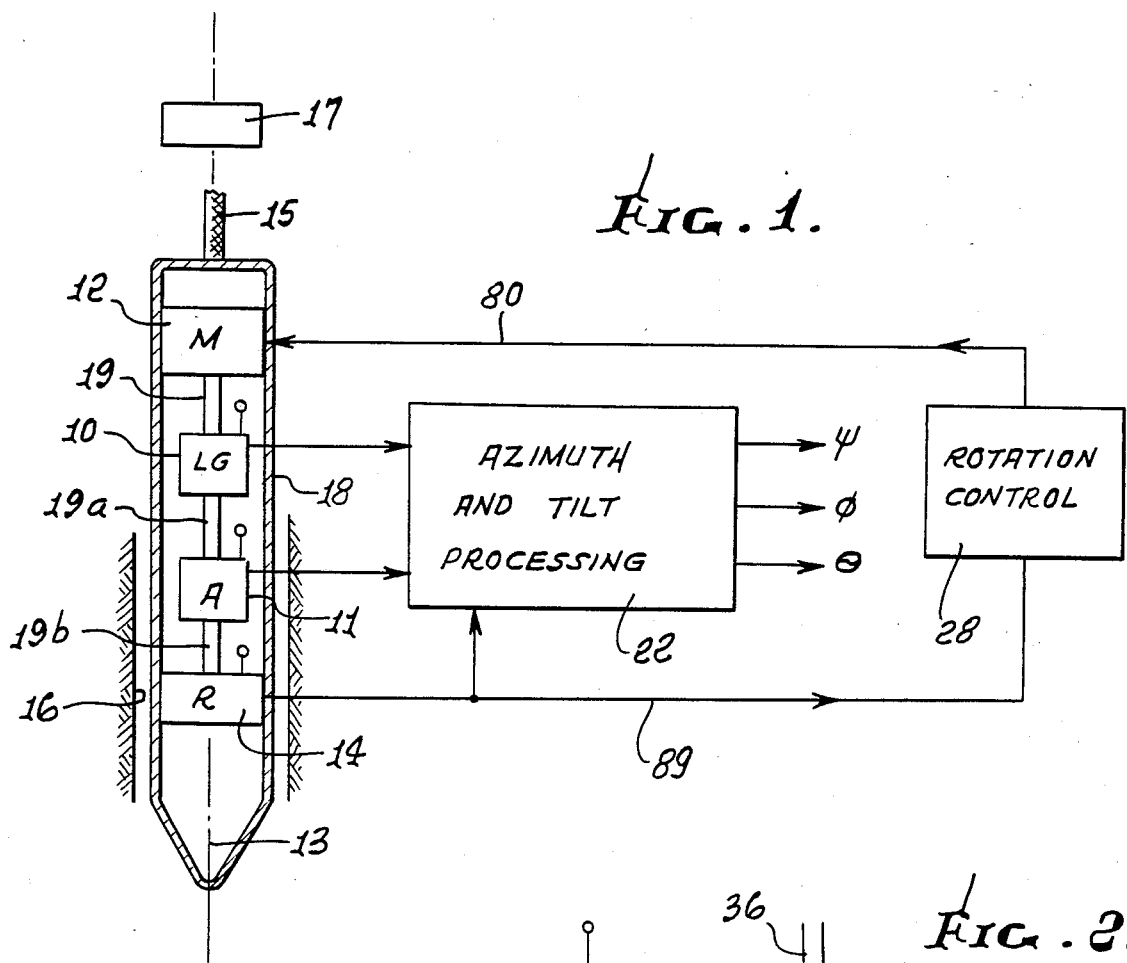
FIG. 1 is an elevation in section showing one form of the invention.

Consider first an arrangement as shown in FIG. 1. It includes an angular rate sensor 10, in the form of a laser gyroscope, whose output is proportional to a component of the earth's rotation rate vector. Also, it includes an acceleration sensing device 11 whose output is proportional to a component of a local gravity vector, and means 12 to rotate these devices about an axis 13, which will generally be along a borehole axis. The means 12 may be a geared timing type motor to provide continuous rotation, or a servoed type motor working with an angle sensor about the rotation axis to provide either a continuous rotation or discrete positioning. These devices, along with resolver 14, are located in a container or carrier 18 that is suspended by cable 15 in a borehole 16, and traveled therein by surface means 17. Motor output shaft 19 has extensions at 19a and 19b to rotate devices 10 and 11, and provide input to the resolver which is also tied to the container 18. See also U.S. Pat. No. 3,753,296, wherein a non-laser type gyroscope is employed.

For this configuration, both the sensing devices 10 and 11 (i.e. LG and A) have single axes of sensitivity, nominally positioned parallel to each other and normal to the rotation axis 13. As the combination of sensing devices is rotated about its rotation axis 13 in a borehole 16, both the sensing devices 10 and 11 will produce variable output indications proportional to the vector dot product of a unit vector along the respective input axis and the earth's rotation rate vector and gravity vector, respectively. For continuous rotation operation at a fixed location in the borehole, these signals will be sinusoidal in nature. For discrete step rotation, the sensor output will be just the equivalent of sampling points on the above mentioned sinusoidal signals. Thus, from a knowledge of sample point amplitudes and position along the sinusoid, the character of an equivalent sinusoid in amplitude and phase may be determined.

The output sinusoidal signals from the sensing devices may be combined and processed as in circuitry indicated at 22, and which may be located in carrier 18 or at the surface to provide the azimuth direction of the borehole axis with respect to the vertical plane containing the direction of the earth's inertial rotation rate vector. The output signal from the acceleration sensing device 11 alone may be used to determine the tilt or drift of the borehole axis with respect to the local gravity field vector. Such determination of directional azimuth $\psi$ and tilt $\phi$ or drift from vertical are free of any constant or bias type errors of the sensing devices.

Note in this regard that the present configuration provides azimuthal direction with respect to true north as defined by the earth's rotation rate vector. Circuitry 28 connected in feedback relation between resolver 14 and motor 12 controls the latter in response to resolver output.

Figure 2:
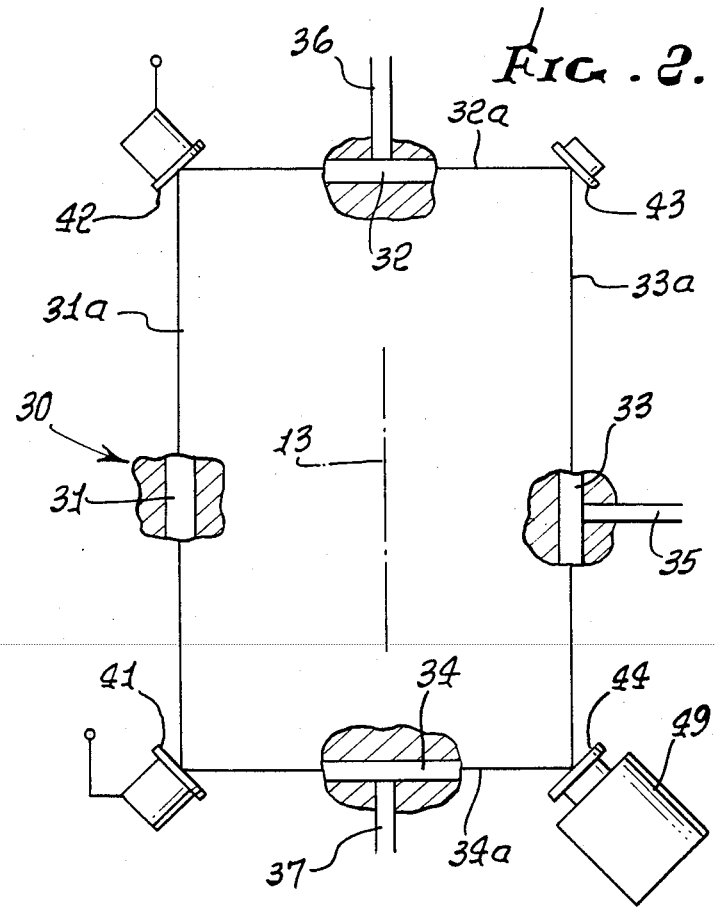
FIG. 2 is a schematic showing of a laser gyroscope.

The laser gyroscope LG is of the general type shown in FIG. 2. A body 30 defines four beam channels 31-34 which define a rectangular ring. The channels contain a gas or gasses suitable for laser operation, examples being neon and helium. Cathode 35 and anodes 36 and 37 produce two laser beams which travel oppositely along the rectangularly shaped optical paths, defined by legs 31a-34a. Legs or stretches 31a and 33a are substantially longer than legs or stretches 32a and 34a, and legs 31a and 33a extend parallel to axis 13. Four mirrors 41-44 are located at the four corners associated with such legs, for reflecting the monochromatic beams around the rectangular optical paths. As the gyro rotates about an axis normal to the plane of the optical path, the effective path length for one beam is increased, and the effective path length for the other beam is decreased, due to Doppler shifting. A beat frequency is produced in response to heterodyning of the two beams, as with a combining prism; and the beat frequency produces a fringe pattern which is typically detected as with a photodiode. Such detecting means is indicated generally at 49. See for example U.S. Pat. No. 4,281,930 to Hutchings.

At very low rates of rotation of the gyro, the difference in frequency between the two beams is small, and it is found that the two beams tend to resonate together, or "lock-in", so that the two beams oscillate at only one frequency. Thus it becomes difficult to detect low rotational rates.

Figure 3:
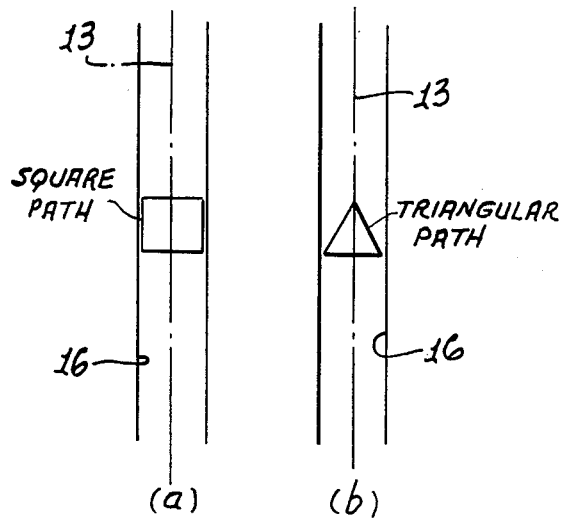
FIGS. 3 and 4 are diagrammatic views.

It is well known that for a ring laser gyroscope the so called "lock band" or "dead zone", the incremental pulse angular scale factor, and the theoretical error limits depend upon the ratio of the area enclosed by the light path to the length of the light path. For the closed path, this is usually referred to as the area to perimeter ratio. It is desirable for accurate surveying to maximize this ratio within the available dimensions of the survey tool. Since the diameter of the survey tool (normal to the borehole axis) must be kept small (on the order of 1" to 2.5") for broad application this dimension is controlling for any ring laser gyroscope. Ring laser gyroscopes have generally been developed using either nominally equilateral triangular shape or nominally square shape for the optical path. It can be shown that the important area to perimeter ratio for a nominally square optical path is approximately 1.75 times greater than that for a nominally equilateral triangle of equal side lengths. Accordingly, the use of the nominally square path in the limited diameter borehole is preferred compared to the nominally triangular path for equal side lengths. FIG. 3 shows the comparison of equal side lengths for a square and triangular path for a ring laser gyroscope in a fixed diameter borehole 16.

Figure 4:
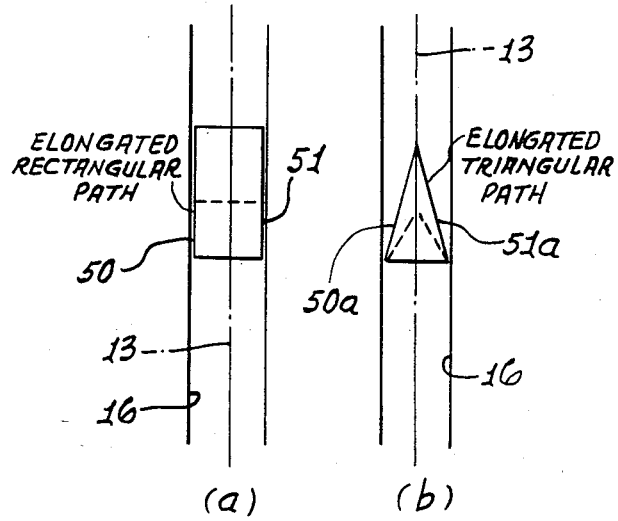

The important area to perimeter ratio is further improved in the limited diameter borehole application by elongating the optical path of the ring laser gyroscope along the borehole axis. FIG. 4 shows this relationship for the four sided and three sided optical path cases. Note the elongation in the borehole direction of sides 50 and 51 in FIG. 4(a), and sides 50a and 51a in FIG. 4(b).

Figure 5:
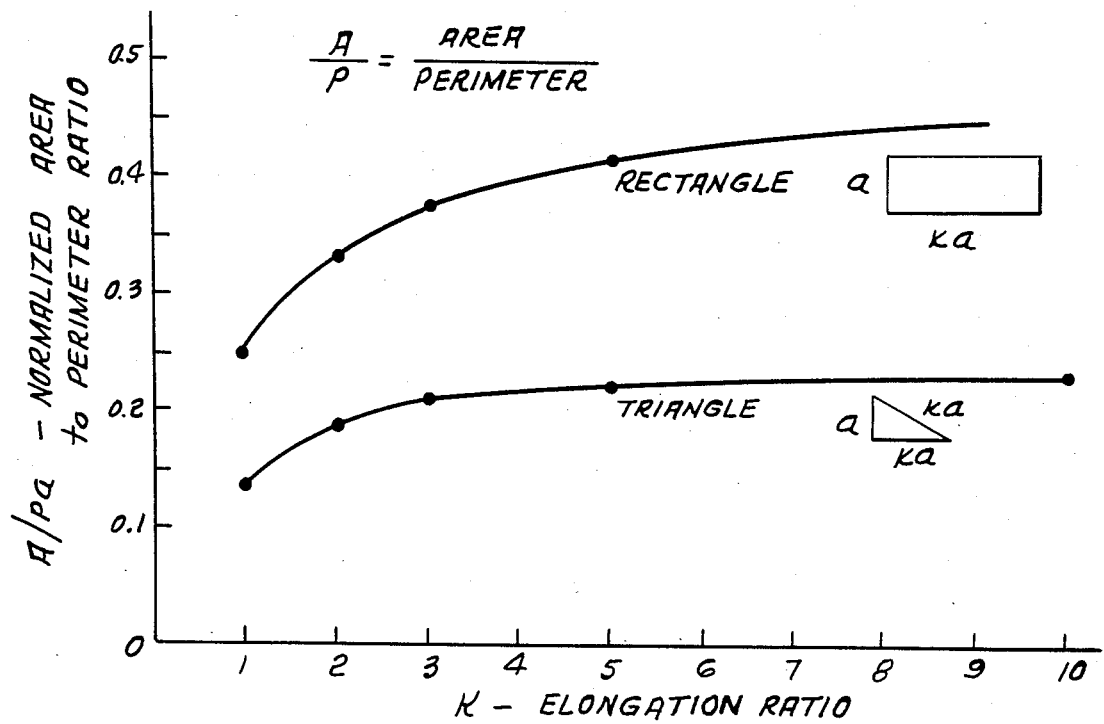
FIG. 5 is a graph.

FIG. 5 shows computed values for normalized area to perimeter ratios for both the rectangular and triangular shapes vs the elongation ratio, k, which is defined as the ratio of the long side to the short side dimension. This shows clearly the previously cited superiority of the basic square shape as well as the benefit derived by elongation in a dimension limited borehole as per FIG. 4. It is apparent that significantly improved area to perimeter ratios are obtained for values of k greater than 1 and that a "point-of-diminishing returns" is reached between k=5 and k=10 such that values above k=5 may not in practice be of great value. However, the basic improvement obtained by elongation in limited diameter installation is a significant benefit in performance for all elongations. Significant advantage is obtained when k is greater than 2.

Figure 6:
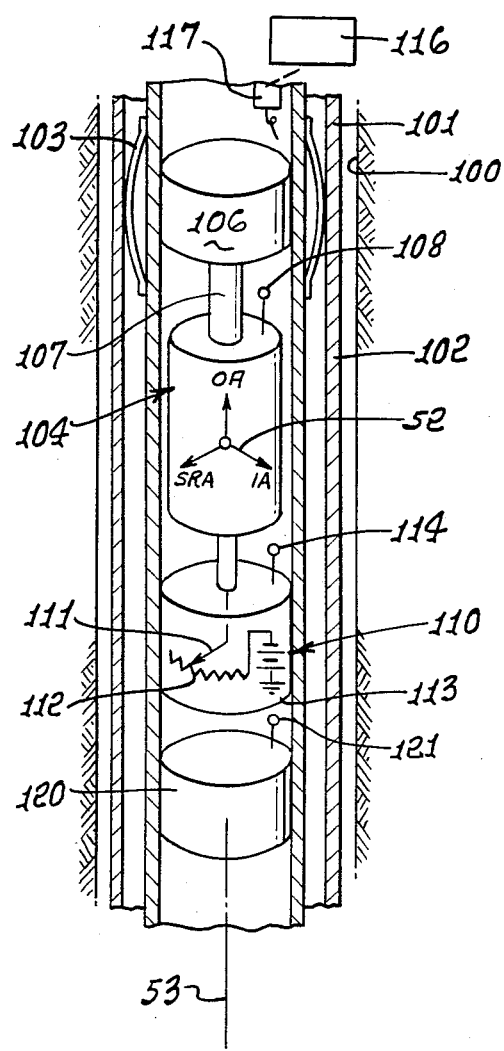
FIG. 6 is a view like FIG. 1, but showing more detail.

A suitable ring laser gyroscope having the properties described above is the Optical Technologies Laboratories, Inc., Newbury Park, Calif., Model L1717 which has a rectangular path with an elongation ratio, k, of approximately 5, and a total optical path length of approximately 17 cm. Such a ring laser gyroscope can be used in a survey instrument generally similar to that disclosed in U.S. Pat. No. 3,753,296, which includes a rate measuring gyroscope having an axis of rate measurement sensitivity normal to the borehole axis. FIG. 6 shows such a configuration, with a ring laser gyroscope having its axis 52 of rate measurement sensitivity normal to the borehole axis 53. The numbered components are as described in U.S. Pat. No. 3,753,296.

As referred to above, ring laser gyroscopes are subject to "locking" at low input angular rates such that no output is obtained until the "locking rate" is exceeded. Any of the well known methods of "unlocking" a ring laser gyroscope for other uses can be applied to the borehole survey usage. Known methods include continuous or oscillatory rotational bias about the input axis, various optical biasing based on Kerr or Faraday magneto-optics effects, and the differential or multioscillator approach. See for example U.S. Pat. No. 3,467,472 to Killpatrick. Any of these methods can be used in a survey tool of the configuration of FIG. 6. Such devices or methods require added apparatus and may provide some bias, which is of disadvantage in borehole applications.

In the borehole survey application a unique opportunity exists to obtain the required unlocking without the addition of any hardware to the gyroscope.

Figure 1A:
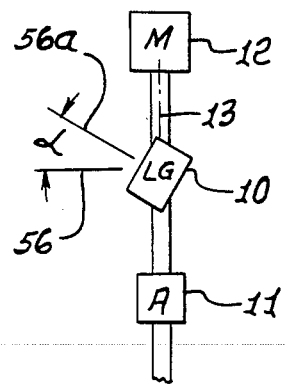
FIG. 1a is a fragmentary view showing elements of FIG. 1, but modified.

As shown in FIG. 1a if the sensing axis 56a is canted through some small angle $\alpha$, from a normal 56 to the borehole axis, then either a continuous rotation or a cyclical reversing motion of the survey tool gimbal can provide the required "unlocking rate". Values of $\alpha$ between about 1 degree and 45 degrees are usable. Trade-offs exist between cant angle $\alpha$, and the previously discussed ring laser gyroscope elongation factor, k, for fixed borehole diameter. For such a fixed diameter, the greater the value of "k", the smaller the value of $\alpha$ must be to physically stay within the fixed diameter. This has a trend toward self-compensation, since in general the "locking rate" will decrease as "k" is increased, and therefore a smaller $\alpha$ is required for unlocking with fixed gimbal rate magnitude.

Figure 7:
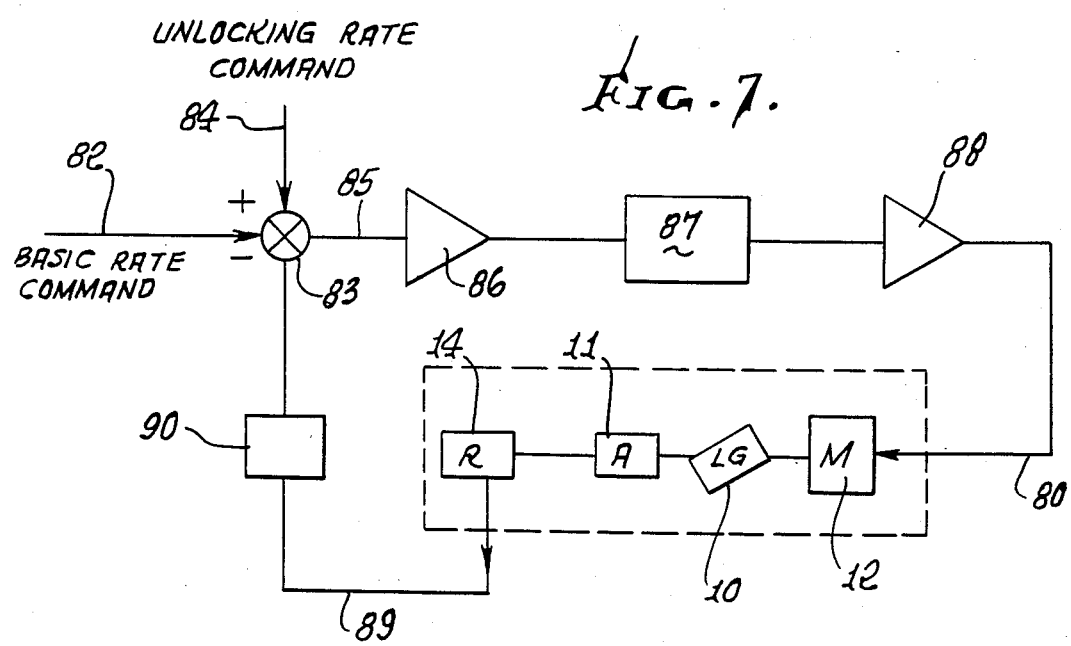
FIG. 7 is a circuit diagram.

Referring to FIG. 1, control of the angular rate of rotation of shaft 19 about axis 13 may be from control equipment 28, which may be at the surface, or at the locus of the instrument, and connected as at 80 with the motor.12. FIG. 7 shows details of circuitry to be used for such control of angular rate. As referred to above, the rate control may be varied in speed and direction so that a series of discrete positions can be obtained as well as constant angular rate of any speed and either direction. In FIG. 7, a basic rate command at 82 is summed at 83 with an unlocking rate command 84 and the result 85 amplified at 86 in a signal amplifier, frequency compensated as required for closed loop dynamics stability in a servo compensation network 87, and amplified in the power amplifier 88 to a sufficient level to drive the motor M shown in FIG. 1. The signal at 89 from the resolver R (such as shaft angle transducer 14 in FIG. 1) is passed through the signal conditioner 90 (providing a derivative function) and then subtracted from the summed rate command, at 83.

The unlocking rate command may be a continuous command, causing continuous rotation, or it may be cyclical at any desired amplitude and direction vs time function. Possible waveforms for such cyclical rate commands include sinusoidal, or square wave, or a zero mean random noise process.

Figure 8:
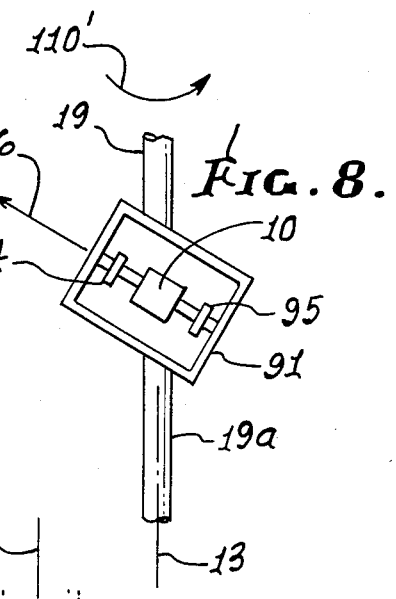
FIG. 8 is a fragmentary view showing a modified mounting of a laser gyroscope.

If unlocking by cyclical motion of the survey tool gimbal is employed, the magnitude of the required reversing rate may be reduced by mounting the ring laser gyroscope to the tool gimbal by a torsional spring allowing rotational motion of the gyroscope about its sensing axis. See FIG. 8, wherein a frame 91 interconnects shafts 19 and 19a (corresponding to these same shafts in FIG. 1). Mounted within or to the frame, as by torsional spring components 94 and 95, is the ring laser gyroscope 10. It is allowed to rotate about sensing axis 56 against resistance imposed by the torsional springs. When the torsional effective spring constant is selected such that the natural frequency of the mount determined by the spring constant and the gyroscope moment of inertia is the same frequency as the reversing gimbal rotation, only a very small gimbal rate magnitude is required to provide the unlocking rate. Arrow 110' indicates gimbal rotation.

Figure 9:
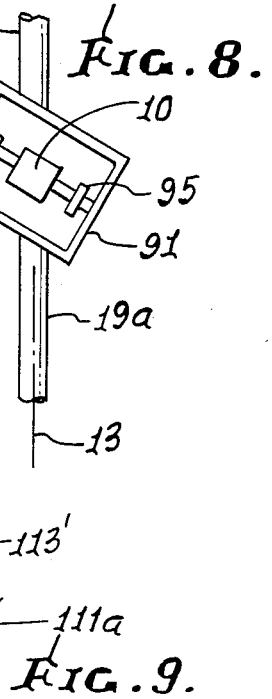

FIG. 9 is a view like FIG. 1a, but showing two laser gyroscopes 111' and 112' slowly rotated by a motor 113' about axis 114', in housing 115, in a borehole. Upper laser gyroscope 111 has its sensitive axis 111a canted in the "xz" plane, and lower laser gyroscope 112' has its sensitive axis 112a canted in the "yz" plane; thus axes 111a and 112a are in planes which are orthogonal, and if the cant angles (relative to normals to axis 114) are zero, the sensitive axes are nominally orthogonal. One of the axes 111a and 112a may be along the borehole axis 114', and the other normal thereto.

I claim:

1. In borehole mapping apparatus, the combination comprising
   (a) a first ring laser gyroscope sized for travel in a direction lengthwise of and within the hole, the laser gyroscope characterized by two laser beams traveling along looping paths in opposite directions, and
   (b) means mounting said gyroscope for travel in the hole and for rotation about an axis extending generally in said direction, each looping path having long and short stretches, the long stretches extending generally in the direction of the borehole, each short stretch extending generally transversely of the borehole, the ratio of the length of a long stretch to the length of a short stretch being substantially greater than 2.

* * * * *